United States Patent [19]

Rumeau et al.

[11] Patent Number: 4,786,386
[45] Date of Patent: Nov. 22, 1988

[54] PROCESS AND APPARATUS FOR THE TREATMENT OF WATER AND EFFLUENTS BY ULTRA-FILTRATION AND ELECTROLYSIS

[75] Inventors: Michel Rumeau, Montpellier; Jean-Paul Mangeolle, Arnouville, both of France

[73] Assignee: Universite des Sciences et Techniques du Languedoc (Montpelier I), Montpelier, France

[21] Appl. No.: 755,606

[22] Filed: Jul. 16, 1985

[30] Foreign Application Priority Data

Jul. 19, 1984 [FR] France ............... 84 11449

[51] Int. Cl.[4] .................... C02F 1/44; C02F 1/46; B01D 13/02
[52] U.S. Cl. .................. 204/182.3; 204/301; 204/302; 204/151; 204/152; 210/650; 210/653
[58] Field of Search ........... 204/151, 182.1, 182.3, 204/182.4, 260, 301, 152, 264, 263, 235, 276, 257, 186, 302, 305, 105–122; 210/650, 651, 652, 653, 654, 655

[56] References Cited

U.S. PATENT DOCUMENTS

| 1,231,967 | 7/1917 | Tainton et al. | 204/264 X |
|---|---|---|---|
| 1,857,224 | 5/1932 | Webber et al. | 204/263 X |
| 2,341,356 | 2/1944 | Briggs | 204/264 X |
| 2,852,453 | 9/1958 | Hausner | 204/264 X |
| 3,072,545 | 1/1963 | Juda et al. | 204/113 X |
| 3,103,474 | 9/1963 | Juda | 204/105 R X |
| 3,309,301 | 3/1967 | Kollsman | 204/182.4 |
| 3,432,410 | 3/1969 | Cuenot | 204/113 X |
| 3,573,181 | 3/1971 | Cochran | 204/182.4 |
| 3,595,769 | 7/1971 | Scheder | 204/182.1 |
| 3,784,460 | 1/1974 | LeBras et al. | 204/182.1 |
| 3,829,370 | 8/1974 | Bourat | 204/182.1 |
| 3,905,886 | 9/1975 | Wang | 204/182.1 |
| 4,033,850 | 7/1977 | Kedem et al. | 204/301 |
| 4,043,896 | 8/1977 | Ahlgren | 204/182.1 |
| 4,048,044 | 9/1977 | Eibl et al. | 204/301 |
| 4,123,342 | 10/1978 | Ahlgren | 204/182.1 |
| 4,124,458 | 11/1978 | Moeglich | 204/301 |
| 4,207,158 | 6/1980 | Freeman | 204/299 R |
| 4,312,729 | 1/1982 | Wills | 204/299 R |
| 4,385,969 | 5/1983 | Kastening et al. | 204/106 X |
| 4,604,174 | 8/1986 | Bollinger et al. | 204/182.1 |

FOREIGN PATENT DOCUMENTS

| 0028837 | 5/1981 | European Pat. Off. | 204/182.1 |
|---|---|---|---|
| 2009789 | 6/1979 | United Kingdom | 204/182.1 |

Primary Examiner—John F. Niebling
Assistant Examiner—John S. Starsiak, Jr.
Attorney, Agent, or Firm—McAulay, Fields, Fisher, Goldstein & Nissen

[57] ABSTRACT

Disclosed are a process and apparatus for the treatment of such fluids as water and effluents by ultra-filtration and electrolysis, useful in particular for the continuous recovery and separation of metallic cations from diluted solutions of their salts and to the softening of water. The apparatus comprises a casing, an ultra-filtration membrane separating the casing into two compartments; a cathode and an anode are respectively housed in two inner compartments separated by an ultra-filtration membrane. The cathodic compartment is connected to an inlet and to an outlet for fluid to be treated, while the anodic compartment is connected to an outlet for the permeate.

6 Claims, 2 Drawing Sheets

PROCESS AND APPARATUS FOR THE TREATMENT OF WATER AND EFFLUENTS BY ULTRA-FILTRATION AND ELECTROLYSIS

BACKGROUND OF THE INVENTION

The present invention relates to a process for the treatment of water and effluents by ultrafiltration and electrolysis, applicable in particular to the recovery and separation of metallic cations continuously from diluted solution of their salts. The process also finds utility for the softening of water. The invention also relates to an apparatus for carrying out said process.

PATENT INFORMATION DISCLOSURE STATEMENT

French Patent Application No. 82 16070 already teaches a process for the recovery of metallic cations from diluted solutions of their salts, in which process the recovery solution, in which the metal was previously converted into complex salt of high molecular weight, is subjected to a first step of fractionation on a semi-permeable membrane whose cut-off threshold is lower than the molecular size of the complexed metallic salt, then to a second step of electrolysis with circulation of the concentrated solution thus obtained, during which the metal is recovered, the complexing agent then being re-introduced into the system. For carrying out this process, two modules are used, one for ultrafiltration, the other for electrolysis, these two modules being placed in series in a rapid circulation loop. This loop comprises, after the electrolysis module, a retaining tank which allows the evacuation of the oxygen formed at the anode, which might oxidize the complexing agent used for the process. This tank, which is at atmospheric pressure, consequently obliges the user continually to raise the pressure in the loop, in order to ensure ultrafiltration. This process therefore involves a considerable consumption of energy and high operational costs. Furthermore, as the anode of the electrolysis module is not separated from the solution to be treated, the complexing agent may be oxidized there.

SUMMARY OF THE INVENTION

It is an object of the present invention to overcome these drawbacks by providing a considerably simplified electrolytic ultrafiltration process and apparatus.

To this end, this process for the treatment of water and effluents by ultrafiltration and electrolysis, applicable in particular to the continuous recovery and separation of metallic cations from diluted solutions of their salts or to the softening of water, comprises carrying out the operations of ultrafiltration and of electrolysis in one and the same cell which is separated by the ultrafiltration membrane into two cathodic and anodic compartments, the water or effluent to be treated, such as a solution of complexed metallic salt, being circulated through the cathodic compartment, whilst the permeate is evacuated from the anodic compartment.

The invention also relates to an apparatus for carrying out the above process, comprising, within a casing, an ultrafiltration membrane separating the casing into two compartments, and a cathode and an anode respectively housed in the two inner compartments separated by the ultrafiltration membrane, the cathodic compartment being connected to an inlet and to an outlet for the water or effluent to be treated, such as a solution of complexed metallic salt, whilst the anodic compartment is connected to an evacuation of the permeate.

The process and apparatus according to the invention offer a number of advantages. Firstly, as the ultrafiltration membrane performs the role both of diaphragm and of filter, the chemical species which are formed at the anode, particularly oxygen, cannot pass again into the loop wherein the solution circulates, as the difference in pressure between the concentrate and the permeate is too high. Consequently, the oxygen formed at the anode is evacuated to the outside with the permeate and there is therefore no more risk of oxidizing the complexing agent when such a complexing agent is used for previously converting the metal present in a solution into a complex salt of high molecular weight. Furthermore, the anode is isolated from the medium to be treated and the complexing agent, when it is present, can therefore not oxidize there. It is no longer necessary to use a retaining tank for the evacuation of the oxygen and this leads to a substantial reduction in pressure drops and in the energy consumption required for operation of the apparatus.

BRIEF DESCRIPTION OF THE DRAWINGS

The invention will be more readily understood on reading the following description with reference to the accompanying drawings, in which.

DESCRIPTION OF THE PREFERRED EMBODIMENTS

Figure 1:
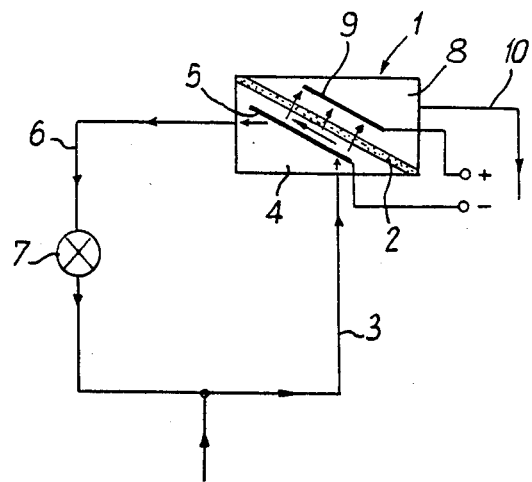
FIG. 1 is a diagram illustrating the process and apparatus according to the invention for recovering metallic cations.

Referring now to the drawings, and particularly to FIG. 1, the apparatus according to the invention comprises an ultrafiltration and electrolysis cell 1, within which is housed a semi-permeable membrane 2 whose cut-off threshold is lower than the molecular size of the complexed metallic salt present in a recovery solution to be treated. This solution is introduced, via a pipe 3, into a first compartment 4 defined by the membrane 2 and in which is housed a cathode 5 connected to the negative pole of a D.C. generator. This cathodic compartment 4 also communicates, via a pipe 6 for evacuation of the concentrate, with a recirculation pump 7 reintroducing the concentrate into the cathodic compartment 4. In the other or anodic compartment 8 defined by the ultrafiltration membrane 2 there is housed an anode 9 connected to the positive pole of the D.C. generator and this anodic compartment 8 communicates with a pipe 10 for evacuation of the permeate.

In the ultrafiltration and electrolysis cell 1, the membrane 2 performs the role both of diaphragm and of filter. The oxygen which is formed at the anode 9 cannot pass again in the recirculation loop constituted by the pipes 3 and 6 connected to the cathodic compartment 4 and the pump 7. This oxygen is evacuated to the outside, through the pipe 10, with the permeate and it therefore does not risk oxidizing the complexing agent found in the solution to be treated.

Such isolation and evacuation of the oxygen formed at the anode 9 prove to be particularly advantageous in the case of electrolysis of copper in an ammoniacal medium, since the oxygen dissolved in the solution normally hinders the process.

Figure 2:
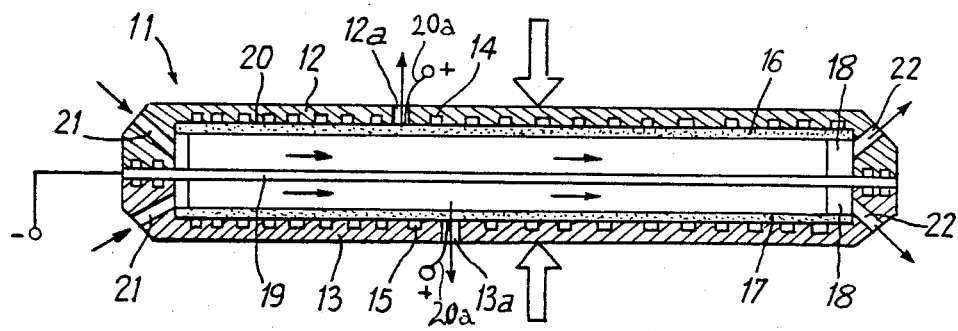
FIG. 2 is a view in longitudinal and vertical section of an ultrafiltration and electrolysis apparatus incorporating flat membranes.

In the non-limiting embodiment shown in FIG. 2, the ultrafiltration and electrolysis apparatus 11 comprises an outer casing in two halves 12, 13 which are symmetrical with respect to a plane, tightened one on the other and which have, in their inner faces, grooves 14, 15 adapted to collect the permeate. On the inner faces of the two half-casings 12, 13 which are pierced with respective orifices 12a, 13a for the evacuation of the permeate, are respectively applied two ultrafiltration membranes 16,17, these two membranes being maintained in spaced apart relationship, along their edges, by spacer members 18. Furthermore, the apparatus 11 comprises a copper plate 19 constituting the cathode, this plate 19 extending across the inner volume of the casing, in the plane of symmetry thereof. This copper plate is between the two half-casings 12,13.

In the apparatus 11 shown in FIG. 2, the two ultrafiltration membranes 16, 17 thus define therebetween a central cathodic compartment across which extends the copper plate 19 constituting the cathode. The solution to be treated is introduced into this central compartment, separated into two by the median copper plate 19, on one side of the casing of the apparatus, through orifices 21. This solution thus flows through the cathodic compartment, from the left towards the right, in the direction of outlet orifices 22 provided in that part of the two half-casings 12, 13 which is opposite the one provided by inlet orifices 21. The permeate is collected in the grooves 14, 15 provided in the inner faces of the two half-casings 12, 13 and it is evacuated to the outside via orifices 12a, 13a.

The anode 20 is formed on the face of each of the membranes 16, 17 opposite the central cathodic compartment and in abutment on the grooved inner faces of two half-casings 12, 13. This anode 20 may be made in any electrically conducting body: it may be constituted, in particular, by a carbon cloth or a metal deposit or by conducting oxides in intimate contact with the membrane 16, 17. The anode 20 is connected, by conducting wires 20a, to the positive pole of a D.C. generator, these wires 20a being adapted to emerge from the apparatus, for example, through the orifices 12a, 13a for evacuation of the permeate.

Figure 3:
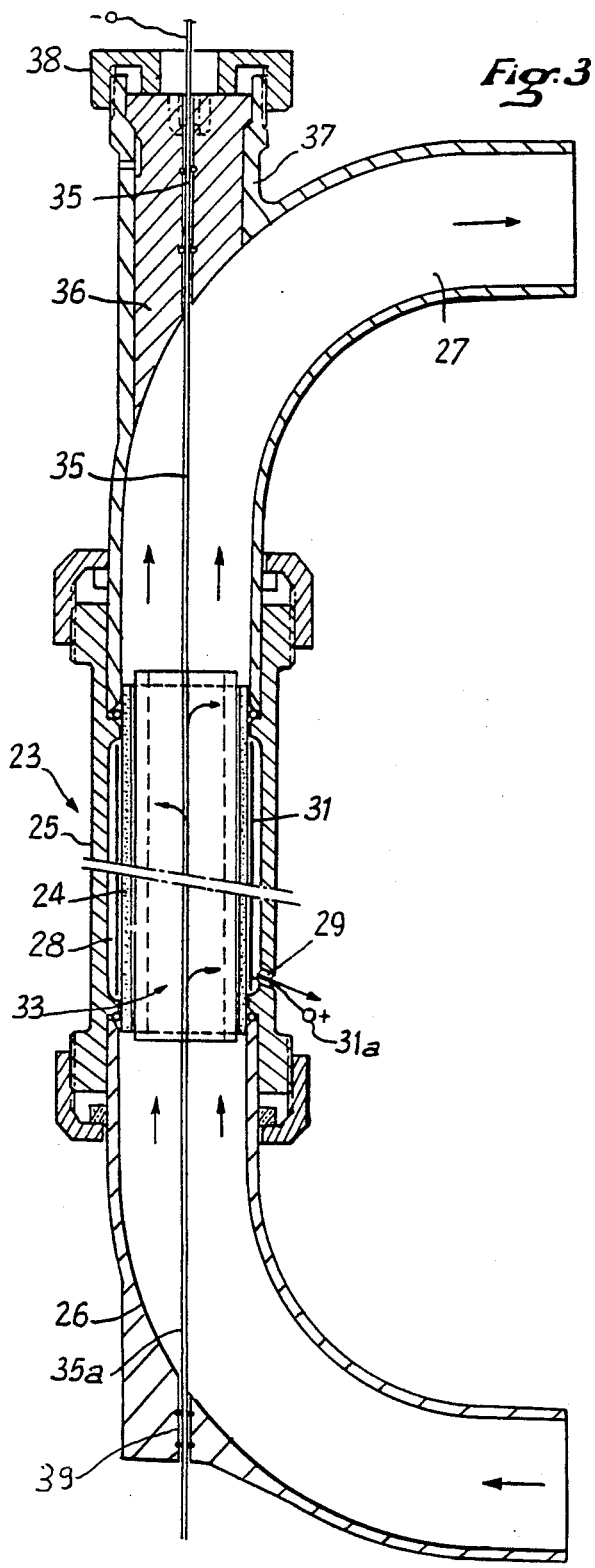
FIG. 3 is a view in vertical and axial section of an ultrafiltration and electrolysis apparatus incorporating a tubular membrane.
Figure 4:
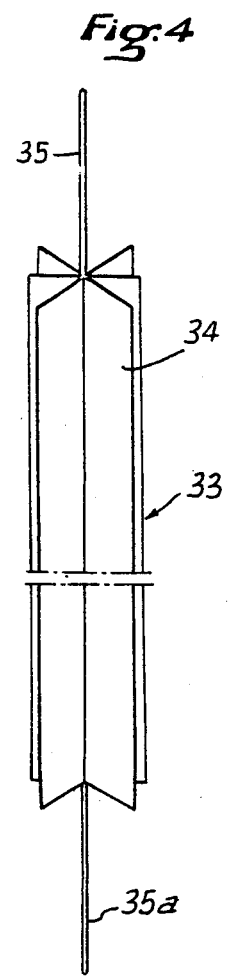
FIG. 4 is a view in perspective of a cathode adapted to be used in the apparatus of FIG. 3.

In the embodiment illustrated in FIGS. 3 and 4, the ultrafiltration and electrolysis apparatus 23 comprises a tubular ultrafiltration membrane 24 completely traversed axially by the solution to be treated. This tubular membrane 24 is housed inside a vertical sleeve 25 at whose lower and upper ends are respectively connected a lower conduit 26 for admission of the solution to be treated and an upper conduit 27 for evacuation of the concentrate. The two lower and upper conduits 26 and 27 are curved and a 90° angle from the vertical.

The outer sleeve 25 inside which the tubular membrane 24 is housed has, on its inner face, longitudinal grooves 28 communicating with an orifice 29 for evacuation of the permeate towards the outside. The anode 31 is formed on the outer surface of the tubular membrane 24. It may be constituted, for example, by a conducting oxide deposit, a metallized layer, a carbon cloth, etc. . . . This anode 31 may also be constituted by a band wound around the tubular membrane 24. This anode 31 is connected, by an electric wire 31a, to the positive pole of a D.C. generator, this wire 31a being adapted to emerge from the apparatus, for example through the orifice 29 for evacuation of the permeate.

The cathode 33 is housed inside the tubular membrane 24. This cathode, as shown in FIG. 4 is advantageously constituted by an assembly of blades 34 disposed regularly about the longitudinal axis, so as to form radial fins. The blades 34 constituting the cathode 33 are engaged axially in the tubular membrane 24 and they are fast, at their two ends, with two axial rods 35, 35a. The upwardly extending axial rod 35 passes through a bearing 36 removably housed in a vertical sleeve 37 integral with the wall of the upper curved conduit 27. More particularly, this sleeve 37 extends coaxially and tangentially with respect to the lower end part of the upper curved conduit 27 and it allows removal, therethrough, of the whole of the cathode 33, without it being necessary to empty the apparatus. Bearing 36 is maintained in position in the sleeve 37 by a threaded stopper 38. The upper rod 35 passes through the bearing 36 and projects outside the apparatus to be connected to the negative pole of the D.C. generator. Similarly, the lower rod 35a fast with the cathode 33 extends downwardly and it projects outside the lower curved conduit 26 through a hole 39 made in the outer wall of the pipe 26, in the vertical axis of the apparatus.

The process and apparatus according to the invention find utility in applications other than the recovery and separation of metallic cations. In particular, they may be applied to the softening of water by modification of the pH at the cathode and precipitation of the calcium carbonate present in the water and which is retained by ultrafiltration, before the membrane. The pH is then re-adjusted accordingly in the anodic compartment, after the membrane.

We claim:
1. A combined electrolytic and ultra-filtration process carried out in one and the same cell for the treatment of a fluid including water and other effluents containing complexing agents and producing permeate and concentrate, comprising the steps of:
   providing a single cell;
   dividing said cell into a cathodic compartment and and anodic compartment by placing therein an ultra-filtration membrane serving as a diaphragm, a filter and as a means for isolating said anodic compartment from cathodic compartment thus causing a difference in pressure between said permeate and said concentrate;
   introducing said fluid in said cathodic compartment;
   effecting electrolysis and ultra-filtration of said fluid in said cell with formation of oxygen in said anodic compartment;
   circulating said fluid in a recirculation loop through said cathodic compartment;
   evacuating concentrate from said cathodic compartment;
   evacuating permeate, oxygen and other chemical species formed from said anodic compartment, whereby said oxygen and said species cannot pass into said cathodic compartment owing to the isolation of said anodic compartment therefrom by said membrane, thereby avoiding the use of a retaining tank for the evacuation of oxygen.
2. The process of claim 1 particularly adapted for the softening of water, and further including the steps of:
   modifying the pH of said water at said cathodic compartment;

precipitating calcium carbonate present in said water;

retaining calcium carbonate by ultra-filtration and before said membrane and;

re-adjusting said pH in said anodic compartment after said membrane, whereby said permeate is evacuated from said anodic compartment without contact with the cathodic compartment while the oxygen formed in the anodic compartment is evacuated with said permeate to avoid oxidizing said complexing agents.

3. An ultra-filtration and electrolysis apparatus comprising in combination;

an upright sleeve;

a tubular ultra-filtration membrane in said sleeve adapted to be. traversed axially by a fluid to be treated;

a first conduit connected with said sleeve and communicating with the lower end of said sleeve for introducing said fluid into said membrane;

a second conduct connected with said sleeve and communicating with the upper part of said membrane and sleeve and serving as an outlet for concentrate;

said sleeve having longitudinal grooves and an orifice passing therethrough for evacuating permeate;

a cathode housed inside said tubular membrane, said cathode comprising an assembly of blades disposed regularly about the longitudinal axis of said membrane and forming radial fins, said fins being engaged axially in said tubular membrane, and means for connecting said cathode to the negative pole of a D.C. generator;

said grooves communicating with said orifice; and an anode formed on the outer surface of said tubular membrane and isolated thereby from said cathode; and means for connecting said anode to the positive pole of the D.C. generator.

4. An apparatus for the combined treatment of fluids such as water and effluents containing complexing agents by both ultra-filtration and electrolysis and in which both ultra-filtration and electrolysis are carried out together, particularly useful in the continuous recovery and separation of complexed metallic salts from diluted solutions of said salts and for the softening of water, comprising in combination:

a outer casing comprising two halves symmetrically disposed with respect to a mutual plane and secured to one another, said halves having inner faces, said faces having grooves thereon for collecting permeate, and said inner faces of said halves having orifices each therethrough forming an outlet for permeate oxygen and other chemical substances;

an ultra-filtration membrane in each of said halves serving both as a diaphragm and a filter;

spacing means for maintaining said two membranes in spaced apart relationship along the edges thereof;

a cathode respectively housed within said outer casing between said halves, an anode in each of said halves connected with a positive pole of a D.C. generator, and said cathode being connected with a negative pole of said D.C. generator;

an inlet and an outlet communicating with each said halves, and a recirculation pump in a line with said inlet and said outlet for removal of concentrate from each said halves through said outlet and for reintroducing the concentrate into each said halves through said inlet; and said orifice forming said outlet for permeate oxygen and other chemical species solely communicating with said inner faces and said anode, whereby said complexing agents cannot be oxidized by said oxygen and the use of a retaining tank for said oxygen is avoided.

5. The apparatus according to claim 4, wherein:

said cathode comprises a plate or conductive material for separating said outer casing into said two halves to form two cathodic compartments, said plate having extremities;

said extremities being secured between said halves of said casing;

said plate and said ultra-filtration membranes defining therebetween a middle cathodic compartment forming said two cathodic compartments;

said inlet in each of said halves for introducing the fluid to be treated into each of said two cathodic compartments of said middle cathodic compartment; and said orifices being positioned on opposite sides of said casing and one for each of said cathodic compartments for removing the fluid after treatment.

6. The apparatus according to claim 4, wherein said anode in each said halves is positioned on the surface of the respective membrane in each of said halves opposite said cathode, said surface of said membranes abutting said grooves.

* * * * *